April 19, 1955     J. W. BLAKELY     2,706,653
UNIVERSAL CLAMP
Filed April 16, 1951
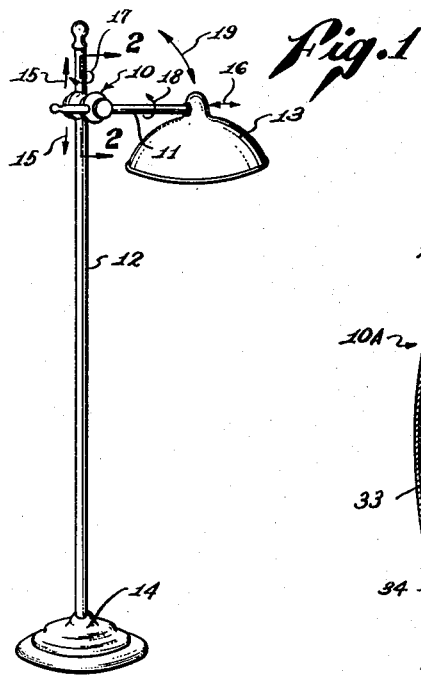
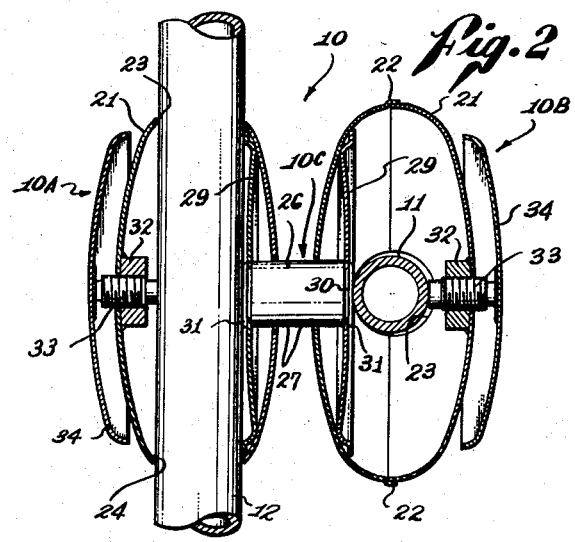
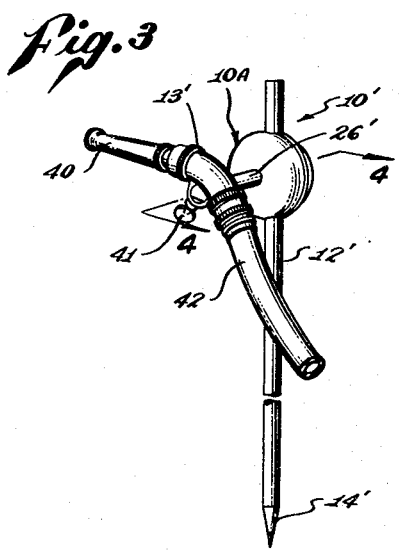
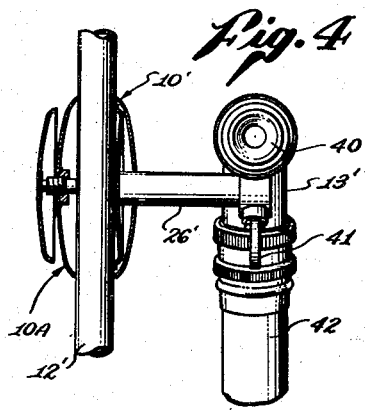
INVENTOR.
JOHN W. BLAKELY
BY
Fulwider & Mattingly
Attorneys

United States Patent Office 2,706,653
Patented Apr. 19, 1955

2,706,653

UNIVERSAL CLAMP

John W. Blakely, North Hollywood, Calif.

Application April 16, 1951, Serial No. 221,239

2 Claims. (Cl. 287—14)

This invention relates to universal clamps, and has particular reference to an adjustable clamp for securing one elongated member to another to provide both rotational and translational adjustments of said members relative to each other. The invention finds particular utility when employed in adjustable supports such as are used for holding inspection lamps, workholders, tools, and the like.

It is a common practice to secure a tool, workholder, or other appliance to an elongated bracket or arm which is in turn secured to a standard or fixed support by means of an adjustable clamp which permits substantially universal adjustment of the location and attitude of the tool or other device carried by the arm. To serve its intended purpose, the adjustable clamp must provide five separate and distinct adjustments. The bracket or arm must be subject to rotational adjustment about the axis of the support, and it must also be capable of rotational adjustment about its own axis. The arm must also be adjustable in rotation about a third axis which is mutually perpendicular to the axis of the arm and to the axis of the support to which the arm is clamped. The device must also provide for translational adjustment of the arm lengthwise of the standard or support, and an adjustment must be provided to allow translational movement of the arm parallel to its own length.

In addition to providing the five adjustments just mentioned, the adjustable clamp must include a readily releasable control, normally locking or holding the parts in their adjusted positions, to allow the parts to be readily moved to new positions of adjustment.

Many of the adjustable clamps which were known prior to this invention did not provide all of the required adjustments just set forth. Others, while providing completely universal adjustment, were of complicated construction and costly to manufacture. Most of the truly universal prior clamps were not arranged for ready and convenient adjustment because they required separate manual control devices for locking each of the five adjustments.

The use of a multiplicity of separate manual controls which must be manipulated in order to reset the device to a new position is undesirable. Ordinarily, one using the device needs one hand to hold the tool or other mechanism carried by the bracket or arm, leaving but one hand free to operate the controls and adjust the clamp. This requires that the controls either be manipulated one at a time, requiring repetitive time-consuming operations before the desired adjustment is achieved, or, if one releases first one of the control means and then another without securing the first, there is the danger that the clamp will slip and the adjustment will be completely lost, resulting in a still further loss of time.

It is therefore an object of this invention to provide a universal clamp of the character above referred to which overcomes the above-noted disadvantages by providing a pair of manual controls which are susceptible to ready and easy operation for securing or releasing the clamp as to all five of the adjustments provided.

It is also an object of this invention to provide a clamp of the character set forth in the preceding paragraph wherein each manual control device serves to lock or release the clamp as to two rotational adjustments and one translational adjustment.

It is another object of this invention to provide a clamp of the character set forth in the preceding paragraph wherein rotational adjustment about a third axis mutually perpendicular to the length of the support and the length of the arm may be had by manipulation of either of the two control means provided.

It is also an object of this invention to provide a clamp of the character set forth in the preceding paragraphs which comprises a pair of arm-receiving members pivotally mounted upon a common pintle for relative rotation of said members about a third axis mutually perpendicular to the axis of the support and the axis of the arm, and wherein a single clamping device for each member serves to secure the arm to the member and lock the member to the pintle.

It is additionally an object of this invention to provide a clamping device of the character set forth in the preceding paragraphs which includes a clutch device between the pintle and each arm-receiving member for releasably securing said arm-receiving members to said pintle.

It is also an object of this invention to provide a clamping device of the character hereinbefore set forth which includes a clamping member for releasably securing an arm to each of the arm-receiving members to provide for rotation and translation of said arm about and parallel to its own axis when said clamping member is released, and wherein locking said clamping member serves to engage said clutch device.

It is a still further object of this invention to provide a universal clamp of the character hereinbefore described which is of simple and inexpensive construction and of neat appearance.

Other objects and advantages of this invention will be apparent from a consideration of the following specification, read in connection with the accompanying drawings, wherein:

Fig. 1 is a perspective view illustrating the preferred embodiment of this invention and its use as a means for permitting adjustment of the position and attitude of an inspection or working lamp, such use being shown as representative of the many uses to which the invention is susceptible;

Fig. 2 is a sectional view taken along the line 2—2 of Fig. 1 and drawn to an enlarged scale to illustrate the details of construction of the universal clamping device of this invention;

Fig. 3 is a perspective view illustrating a modified form of the invention; and

Fig. 4 is a sectional view taken substantially along the line 4—4 of Fig. 3 and showing the construction of the modified form of clamp.

One of the many uses of the universal clamp of this invention is illustrated in Fig. 1, wherein the clamping device, indicated generally by the reference 10, is used to adjustably secure an arm or bracket 11 to an upright support or standard 12. Upon the outer end of the arm 11 there is secured an appliance 13 which, in the example shown in Fig. 1, takes the form of a lamp and reflector such as may be used as a working or reading light or as an inspection light in a manufacturing establishment.

The support 12 may be permanently secured to the floor or fixed part of the building, or alternatively, may be provided with a weighted base 14 of such weight and dimensions as to hold the standard 12 securely in an upright position.

As will become more apparent from the ensuing detailed description of the construction of the device, the universal clamp 10 provides for five separate adjustments of the position and attitude of the appliance 13. These adjustments comprise two translational adjustments and three adjustments in rotation.

One of the translational adjustments permits the appliance 13, the arm 11, and the clamp 10 to be moved longitudinally of the standard 12 as is indicated in Fig. 1 by the arrows bearing the reference characters 15. The other translational adjustment permits the arm 11 to be moved parallel to its own axis relative to the clamp 10, as is represented by the double-headed arrow 16 in Fig. 1.

The three adjustments in rotation are arranged to be about three mutually perpendicular axes. The clamp allows adjustment of the location of the appliance 13 by rotating the arm 11 about the axis of the standard 12, as is represented by the circular arrow 17 in Fig. 1. The attitude of the appliance 13 may be changed by rotating the arm 11 about its own axis, as is represented by the circular arrow 18 in Fig. 1. Finally, the arm 11 may be rotated about a third axis which is mutually perpendicular to the axis of the standard 12 and the arm 11, and which passes through both of these axes at the location of the clamping member 10. This adjustment allows the attitude of the appliance 13 to be changed in the manner indicated by the double-headed arcuate arrow 19 of Fig. 1.

The details of construction of the clamping device 10 which provides for the aforementioned adjustments are illustrated in Fig. 2, from which it will be seen that the clamping device 10 comprises a pair of identical clamping units 10A and 10B which are joined by a connecting member 10C. Each of the identical clamping units 10A and 10B comprises a clamping unit body 21 which may comprise a hollow ellipsoidal member conveniently formed by a stamping or drawing process from sheet metal of a suitable gauge, being made in halves and joined together at the equator by a welded or riveted overlapping joint such as is represented at 22. Each member 21 is provided with a transversely extending arm-receiving passageway of circular cross-section defined by circular openings 23 and 24 situated at diametrically opposite positions in the hollow shell of the member 21.

It will be understood that the support or standard 12 passes through the arm-receiving passageway of the clamping unit 10A, whereas the arm 11 extends in a similar fashion through the arm-receiving passageway of the unit 10B. The apertures 23 and 24 which define these passageways are made somewhat larger in diameter than the standard 12 and the arm 11, for reasons which will appear hereinafter.

The two arm-receiving members 21 are pivotally mounted upon opposite ends of the connecting member 10C which takes the form of a short pivot member or pintle 26 and passes through suitable apertures 27 formed in the adjacently disposed faces at the poles of the hollow arm-receiving members 21. The pintle 26 extends well into the interior of each of the hollow members 21 so as to dispose the ends thereof within the circular passageways which receive the standard 12 and arm 11, but not so far as to prevent the passage of these members through such passageways.

Upon each end of the pintle 26 there is mounted a circular clutch member 29 of dished or saucer-like form secured and fixed to the ends of the pintle 26 by a reduced-diameter portion of the pintle 26 which is extended through a bore 30 in the center of the clutch member 29 and riveted over on the inner surface as indicated at 31. The clutch 29 is made with a diameter sufficient to engage the inner surface of the hollow member 21 when the pintle 26 is in its normal position extending into the arm-receiving passageways. In such position, the pintle 26 extends a greater distance into the interior of the members 21 than appears in Fig. 2, which shows the relative positions of the parts in the locked or clamped position of the apparatus.

As will be more fully explained hereinafter, the clutch members 29 are resilient and may be flexed to allow the hollow members 21 to be moved outwardly along the pintle 26 an amount sufficient to bring the inner ends of the pintle 26 nearly to a position tangent to the circular passageway through the hollow members. This movement and attendant flexing of the clutch members 29 provides a high degree of friction opposing rotation of the members 21 relative to the pintle 26.

The clamping device includes also a control means for each of the arm-receiving members 21 for engaging and clamping the units 10A and 10B to the standard 12 and the arm 11. To this end there is provided on the inner surface of each of the members 21 a thickened portion or boss 32 which is located diametrically opposite the opening 27, and in axial alignment with the pintle 26. The boss 32 is internally threaded to receive a clamping screw 33 which carries on its outer end a suitable handle or manual control 34 which, like the shells of the members 21, may be formed of sheet metal of suitable thickness by a die-stamping or drawing operation. The handle 34 may conveniently be secured to the clamping screw 33 by welding or similar means.

The inner end of the clamping screw 33 is adapted to bear against the support 12 or arm 11, and upon rotation of the screw 33 the same advances inwardly into the shell 21 so as to clamp the arm 11 or support 12 between the end of the screw 33 and the end of the pintle 26.

After initial engagement of the end of the screw 33 with the arm 11 or 12 to clamp the same between the end of the screw 33 and the end of the pintle 26, the screw 33 may be further rotated in the same direction to draw the hollow member 21 outwardly over the pintle 26. This movement is permitted by reason of the arm-receiving passageway being larger than the arm which passes therethrough, and by reason of the resilience of the clutch 29. As the outward movement of the hollow member 21 is continued, the clutch 29 flexes and the frictional engagement of the clutch member 29 with the inner surface of the hollow member 21 is steadily increased. At the same time, the force with which the arm 11 is clamped between the end of the screw 33 and the end of the pintle 26 increases proportionally, the magnitude of the clamping force being dependent upon the stiffness of the clutch 29.

By suitably adjusting the stiffness of the clutch member 29, the device may be arranged so that approximately one-half turn of the screw 33 after the initial clamping of the arm against the pintle will provide such a clamping force as to securely lock all of the parts against any movement relative to each other. Thus by adjusting the angular position of the control 33 within this one-half turn range, it is possible to vary the degree of clamping from a very light clamping pressure capable of being overcome by relatively small displacing forces to a large clamping force capable of holding parts rigidly fixed under any reasonable load condition.

It will be seen that the clamping device 10 just described provides the five separate adjustments hereinbefore mentioned with reference to Fig. 1, and that these adjustments are under the control of the two manual control devices 34. When the control device 34 associated with the clamping unit 10B is released, the arm 11 may be moved lengthwise through the unit 10B, it may be rotated about its own axis, and it and the member 21 may be rotated about the axis of the pintle 26. In the same way, the manual control device 34 associated with the clamping unit 10A allows the clamp 10 to be moved up or down along the standard 12, allows it to be rotated as a unit about the axis of the standard 12, and allows the arm 11 to be rotated about the axis of the pintle 26.

For certain uses it is not necessary to provide all five of the adjustments afforded by the clamp 10 described with reference to Figs. 1 and 2, and in these cases it is possible to utilize a simpler form of the device such as is indicated generally by the reference character 10' in each of Figs. 3 and 4.

The simplified clamping device 10' may comprise a clamping unit such as the unit 10A hereinbefore described adjustably supported upon a standard 12' and carrying a pintle 26' which, in this form of the invention, is made somewhat longer than in the previously described modification so as to serve as a bracket arm upon which a tool, appliance, or the like such as a fixture 13' may be secured.

As an example of one of the many uses of the modified form of the invention, the device may be used as a gardening accessory to adjustably support a garden spray nozzle 40, in which case the fixture 13' may comprise an elbow member suitably secured to the pintle 26' as by a set screw 41 and serving to connect the nozzle 40 to a garden hose 42. The lower end of the standard 12' may be pointed as shown at 14' to allow the standard to be driven into the soil to be held thereby firmly in an upright position. As may be seen by reference to Fig. 4, the clamping unit 10A and its relation to the pintle 26' is identical to that described with reference to Fig. 2 hereof, the difference being in the elongation of the pintle 26' to serve as a bracket or fixture-carrying arm.

The device illustrated in Figs. 3 and 4 provides three separate adjustments—the pintle 26' may be rotated about its own axis, and may be rotated about the axis of the standard 12', and the entire structure may be moved up and down on the standard 12'.

From the foregoing it will be seen that this invention provides a truly universal clamp which is particularly adapted for adjustably securing together a pair of arms such as a supporting standard and an appliance-carrying arm. Attention is directed to the fact that the device requires only two manual control devices for locking or releasing the clamp as to each of its five adjustments. Each of the control devices 34 controls two rotational and one translational adjustments. Adjustment about the third axis—that is, the axis of the pintle 26—may be controlled by either of the two control devices 34.

One important feature of this invention is the provision of the clutch member 29, which allows the device to be adjusted to a nice degree so that the appliance supported by the arm 11 may from time to time be moved to new positions and attitudes without requiring manipulation of the members 34, while at the same time being held in each new adjusted position with sufficient firmness to remain steady during use of the device. In this connection, attention is directed to the fact that the frictional engagement of the clutch members 29 with the inner surface of the hollow shells within which they are placed occurs at a relatively large diameter so that it is possible to provide adequate resistance to turning while at the same time providing a smoothly working control of the character described.

Attention is also directed to the simplicity of the construction employed, permitting the device to be manufactured in quantities at low cost, and in this connection attention is directed to the forming of the hollow members 21 in halves as sheet metal drawings or stampings, the halves being suitably secured to each other to define the complete ellipsoidal member.

It will be seen that the structure described presents a neat and trim appearance and provides a simplicity and ease of control which makes very simple the task of adjusting the attitude or location of the appliance carried by the arm 11.

While the preferred embodiment of this invention has been illustrated and described herein, the same is not to be limited to the details of construction illustrated and described, except as defined in the appended claims.

I claim:

1. A clamping unit for use in a universal clamp for adjustably securing a pair of arms to each other, comprising: a hollow clamping unit body having diametrically opposed apertures therein for loosely receiving one of said arms and normally permitting said arm to rotate about its own axis and move lengthwise relative to said unit; a pivot shaft; means mounting said body on said shaft for rotation relative thereto and for movement therealong, said shaft being disposed at substantially a right angle to said arm and the inner end of said shaft being disposed within said body in a position to bear against said one arm; a clutch member within said hollow body secured to the inner end of said shaft, said clutch member comprising a disk-like axially flexible member disposed in peripheral frictional engagement with the inner surface of the wall of said hollow body; and a clamping screw carried by said body in a position to engage said arm, said screw being operable upon rotation to clamp said arm between said screw and the inner end of said shaft and move said body outwardly along said shaft, whereby said clutch member is flexed to thereby increase the frictional engagement of said clutch member with said body and proportionally increase the clamping force on said arm between said screw and the inner end of said shaft.

2. In a universal clamp for adjustably securing a pair of arms to each other, the combination of: a pair of clamping units associated respectively with said pair of arms, each of said units comprising a hollow body having diametrically opposed apertures therein for loosely receiving the associated arm and normally permitting said arm to rotate about its own axis and move lengthwith relative to said unit; a pivot shaft; means mounting said bodies on opposite ends of said pivot shaft for rotation relative thereto and for movement therealong, said shaft being disposed at substantially right angles to both of said arms, and the inner ends of said shafts being disposed in positions within said bodies to bear against the associated arms; a pair of clutch members, one within each of said bodies, secured to the inner ends of said shaft, each of said clutch members comprising a disk-like axially flexible member disposed in peripheral frictional engagement with the inner surface of the wall of said hollow body; and a pair of clamping screws, one for each of said clamping units, each of said screws being carried by the associated body in a position to engage the associated arm, said screw being operable upon rotation to clamp said arm between said screw and the inner end of said shaft and move said body outwardly along said shaft, whereby the associated clutch member is flexed to thereby increase the frictional engagement of said clutch member with said body and proportionally increase the clamping force on said arm between said screw and the inner end of said shaft.

References Cited in the file of this patent

UNITED STATES PATENTS

| 696,534 | Assell | Apr. 1, 1902 |
|---|---|---|
| 857,428 | Weston | June 18, 1907 |
| 1,190,502 | Anderson | July 11, 1916 |
| 1,408,834 | Seavey | Mar. 7, 1922 |
| 1,559,093 | Hansen | Oct. 27, 1925 |
| 1,631,831 | Palmer | June 7, 1927 |
| 2,060,171 | Burton | Nov. 10, 1936 |
| 2,101,317 | Lemieux | Dec. 7, 1937 |
| 2,575,917 | Johnson | Nov. 20, 1951 |

FOREIGN PATENTS

| 34,928 | Netherlands | of 1934 |
|---|---|---|
| 84,736 | Switzerland | of 1920 |